United States Patent [19]

Hager

[11] Patent Number: 5,648,559

[45] Date of Patent: Jul. 15, 1997

[54] POLY(OXYPROPYLENE/OXYETHYLENE) RANDOM POLYOLS USEFUL IN PREPARING FLEXIBLE HIGH RESILIENCE FOAM WITH REDUCED TENDENCIES TOWARD SHRINKAGE AND FOAM PREPARED THEREWITH

[75] Inventor: Stanley L. Hager, Crosslanes, W. Va.

[73] Assignee: Arco Chemical Technology, L.P., Greenville, Del.

[21] Appl. No.: 734,561

[22] Filed: Oct. 21, 1996

Related U.S. Application Data

[62] Division of Ser. No. 592,087, Jan. 26, 1996.

[51] Int. Cl.$^6$ .......................... C07C 43/11; C07C 43/18
[52] U.S. Cl. .................. 568/620; 521/174; 568/619; 568/624
[58] Field of Search ........................... 568/620, 624, 568/619; 521/174

[56] References Cited

U.S. PATENT DOCUMENTS

| | | | |
|---|---|---|---|
| 5,144,093 | 9/1992 | Reisch et al. | 568/620 |
| 5,235,114 | 8/1993 | Reisch et al. | 568/620 |
| 5,357,038 | 10/1994 | Reisch et al. | 568/620 |
| 5,391,722 | 2/1995 | Chandalia et al. | 568/620 |

*Primary Examiner*—Morton Foelak
*Attorney, Agent, or Firm*—Dennis M. Kozak

[57] ABSTRACT

High resilience polyurethane foams exhibiting little or no shrinkage may be prepared from low unsaturation double metal cyanide catalyzed polyoxyalkylene polyols in amounts greater than 20 weight percent of the total polyol component, when low unsaturation poly(oxypropylene/oxyethylene) random polyols having less than 35 weight percent of an all polyoxypropylene block catalyzed by double metal cyanide catalysts and one or more external random polyoxypropylene/polyoxyethylene blocks each containing 2 weight percent or more oxyethylene moieties, and an unsaturation of less than 0.02 meq/g are employed.

8 Claims, No Drawings

POLY(OXYPROPYLENE/OXYETHYLENE) RANDOM POLYOLS USEFUL IN PREPARING FLEXIBLE HIGH RESILIENCE FOAM WITH REDUCED TENDENCIES TOWARD SHRINKAGE AND FOAM PREPARED THEREWITH

This is a division, of application Ser. No. 08/592,087 filed Jan. 26, 1996 now allowed.

TECHNICAL FIELD

The present invention pertains to high resilience (HR) flexible polyurethane foam. More particularly, the present invention pertains to shrink-resistant HR foam prepared by reacting an isocyanate component with a poly(oxypropylene/oxyethylene) polyol component manufactured at least in part with a double metal cyanide catalyst.

BACKGROUND ART

Flexible polyurethane foams are well recognized articles of commerce. The two most common classifications of flexible polyurethane foams are conventional and high resilience (HR). Flexible foams may also be characterized by the process used in production, either molded or free rise. Free rise foams are often made in a continuous slabstock process. In slabstock foam, the reactive foam forming ingredients, including any necessary catalysts, blowing agents, and foam stabilizing surfactants, are mixed and deposited on a moving, and generally lined, conveyor belt where the foam is allowed to rise freely. After cure, the foam is then sliced to the appropriate thickness for its intended use, for example as seat cushions, mattresses, carpet underlay, and the like. Molded foams are typically manufactured within an enclosed chamber having the shape of the desired finished article. HR foam is manufactured by both free rise and molded processes.

High Resilience (HR) foam is defined by ASTM Method D3770-91, although the industry generally recognizes a wider category of foams which may be designated as HR foams. In particular, foams manufactured with HR chemicals but having densities lower than the limits specified in D3770-91 are also included in the wider category. These lower density foams are also included in the HR designation employed in this application. In general, HR foams are characterized by higher comfort or support factor and higher resilience than non-HR foam or "conventional" foam. HR foam is generally prepared by employing as the isocyanate-reactive component, a polyoxyalkylene polyol containing a stably dispersed polymer phase, a low molecular weight crosslinker/extender, generally diethanolamine, water as a reactive blowing agent, and amine and/or tin catalysts. While molded HR foam often employs methylene diphenylene diisocyanate or polymethylene polyphenylene polyisocyanate, often in specific isomer ratios and often in combination with toluene diisocyanate (TDI), HR slab-stock foam is generally prepared solely or predominately with TDI, either as an 80/20 or 65/35 blend of the 2,4-, and 2,6-isomers.

The surfactants used for conventional slab-stock foam and HR foam also differ, the latter generally employing a less potent surfactant such as the silicone surfactants described in U.S. Pat. No. 4,690,955. These low potency silicones are characterized by their lower molecular weight and minimal number of siloxane moieties in their molecular backbone, typically 20 or less. In some cases, non-silicone low potency surfactants may be used successfully.

The polyol polymer dispersions used in HR foam contain stably dispersed polymer particles generally prepared by in situ polymerization of polymerizable monomers in a polyoxyalkylene base polyol. One type of polyol polymer dispersion is the product obtained by the in situ polymerization of one or more vinyl monomers such as styrene and acrylonitrile in a polyoxyalkylene base polyol. Such polyol polymer dispersions are termed "polymer polyols" herein. A further polyol polymer dispersion is the type prepared by the in situ polymerization reaction between a di- or polyisocyanate and a low molecular weight isocyanate reactive species such as water, hydrazine, diamines, or alkanolamines. Such polyol polymer dispersions are termed "polymer-modified polyols" herein. While polyol polymer dispersions of either type may be made with the solids level required for a particular HR foam, i.e. in the range of 2 to 35 or more weight percent solids, it is common to prepare the polyol polymer dispersion at the highest solids level practical and then dilute the polyol polymer dispersion with additional polyol, which may be the same or different from the polyol polymer dispersion base polyol, to obtain the desired solids level. In this manner, maximum use is made of polyol polymer dispersion production capacity. In the past, it has been found, in general, that the polyoxyalkylene base polyol and any additional polyol subsequently blended to prepare the polyol component must have a high primary hydroxyl content in order to provide suitable reactivity. This is typically achieved by reacting ethylene oxide onto a polyoxypropylene core.

The high water levels used in preparing HR foams, particularly in the lower density range, create a problem with regard to processing latitude. In particular, it has proven difficult to process foams at isocyanate indexes of less than 100 and greater than 115. In U.S. Pat. No. 5,171,759, processing latitude is increased by inclusion in the conventionally catalyzed polyol component, a first, higher functionality polyol containing between 8 and 25 weight percent oxyethylene moieties, and a second polyol containing 70 weight percent or more polyoxyethylene moieties.

In U.S. Pat. No. 5,010,117, the use of polyoxypropylene polyols having a low monol content reflected by an unsaturation of less than 0.040 meq/g, as measured by ASTM D-2849-69 "Testing Urethane Foam Polyol Raw Materials", is suggested as a means of improving foam green strength and compression set. However, the patent exemplifies only molded foam prepared from high primary hydroxyl content polyols, and fails to examine polyoxypropylene polyols having unsaturations of less than 0.027 meq/g. Also, no examples are cited in which a double metal cyanide catalyst was used to prepare such polyols as described below.

Double metal cyanide (DMC) catalysts were discovered in the decade of the 1960's to be efficient oxyalkylation catalysts suitable for preparing polyoxyalkylene polyether polyols having notably lower levels of unsaturation, and thus monol content, than polyols prepared by traditional base catalysis. Unsaturations in the range of 0.018 to 0.025 meq/g were achieved. However, the cost/activity ratio of such catalysts coupled with the difficulty of removing catalyst residues from the polyol product prevented commercialization. Improved catalysts such as those disclosed in U.S. Pat. No. 5,158,922 showed higher activity and lowered unsaturation further, to the range of 0.015 to 0.018 meq/g. However, again, cost and processing difficulties prevented commercialization.

The use of double metal cyanide catalyzed polyols in HR foam production has not been actively pursued due to difficulties in achieving high primary hydroxyl levels through capping with ethylene oxide. DMC catalysts tend to homopolymerize ethylene oxide rather than add to existing secondary hydroxyl moieties, thus restricting the primary hydroxyl levels to less than 50% under normal production conditions. Introducing strongly basic catalysts for the ethylene oxide addition stage adds significant additional cost and complexity to the process.

Most recently, the ARCO Chemical Company has developed new double metal cyanide complex catalysts which offer exceptionally high catalytic activity coupled with the ability to remove catalyst residues by simple filtration. Polyoxyalkylene polyols prepared with such catalysts have exceptionally low levels of unsaturation, in the range of 0.003 to 0.010 meq/g.

The higher molecular weights and functionalities of DMC catalyzed polyols and lack of monofunctional species which serve as chain terminators in polyurethane polymerization reactions has led to the belief that use of such polyols to prepare polyurethanes will lead to improved properties and superior performance in many applications. However, it has been found that ultra low monol, ultra low unsaturation polyols produced with DMC catalysts are not simply "drop-in" replacements for conventional base catalyzed polyols. For example, R. L. Mascioli, "Urethane Applications for Novel High Molecular Weight Polyols," 32ND ANNUAL POLYURETHANE TECHNICAL/MARKETING CONFERENCE, Oct. 1–4, 1989, disclosed that polyurethane flexible foams prepared from a c.a. 11,000 Da molecular weight triol rather than a conventionally catalyzed 6200 Da triol produced a stiff and boardy foam. Due to the higher molecular weight of the polyol, a softer foam would have been expected.

Moreover, it has been found that addition of as little as 20 weight percent of a polyol, produced at least in part by DMC catalyzed oxypropylation, to the polyol component of an HR foam formulation results in a commercially unacceptable "tight" foam which exhibits severe shrinkage. Increasing the primary hydroxyl level by capping with a mixture of EO and PO in the latter stages of the DMC catalyzed polymerization did not avoid the tightness problem. Moreover, even higher primary hydroxyl, low unsaturation polyols prepared by DMC catalyzed oxypropylation followed by base catalyzed capping with ethylene oxide failed to solve the shrinkage problem.

Double metal cyanide complex catalysts capable of preparing very low unsaturation polyols offer the potential for preparing polyurethanes with improved physical properties. Future development may also result in the opportunity to produce polyoxyalkylene polyols at lower prices. However, in order to make use of these potential advantages in HR polyurethane foam, it is necessary to eliminate the shrinkage and tightness of foams prepared from these polyols. It is also preferable to produce such foams from polyols having moderate primary hydroxyl levels that can be achieved with DMC catalyst without resorting to base catalyzed addition of ethylene oxide at the end of the polymerization.

SUMMARY OF THE INVENTION

It has now been surprisingly discovered that HR foam may be prepared from a polyol component containing in excess of 20 weight percent of low unsaturation polyols made with DMC catalysts, without excessive shrinkage or tightness, when the low unsaturation polyols are poly (oxypropylene/oxyethylene) random. copolymers prepared by the mixed oxyalkylation via DMC catalysis of one or more initiator molecules during a substantial portion of the total DMC-catalyzed oxyalkylation. Most surprisingly, low unsaturation DMC catalyzed polyoxyalkylene polyols having substantially all-oxypropylene internal blocks and external random oxypropylene/oxyethylene blocks, and low unsaturation polyoxyethylene-capped polyoxypropylene block polyols do not offer these advantages. Though the source of the foam tightening experienced with DMC catalysis of polyols containing all poly(oxypropylene) blocks is not fully understood, it is believed to be associated with a tendency to extend some of the block structures to longer lengths than is typical with standard base catalysis.

DESCRIPTION OF THE PREFERRED EMBODIMENTS

The HR foams of the present invention are prepared by reacting an isocyanate component with a polyol component in the presence of water as a reactive blowing agent, further in the presence of one or more catalysts, foam stabilizing surfactants, and optionally conventional additives and auxiliaries, e.g. chain extenders/crosslinkers, physical blowing agents, colorants, fillers, flame retardants, and the like. Examples of suitable isocyanates, catalysts, additives and auxiliaries may be found in U.S. Pat. No. 5,171,759, herein incorporated by reference, in J. H. Saunders and K. C. Frisch, POLYURETHANES: CHEMISTRY AND TECHNOLOGY, Inter-science Publishers, New York, 1963, and the POLYURETHANE HANDBOOK, Gunter Oertel, Ed., Hanser Publications, Munich, ©1985.

The isocyanate component generally comprises one or more di- or polyisocyanates such as those commercially available. Both aliphatic, cycloaliphatic, and aromatic isocyanates are useful. Preferred isocyanates are the commercially available mixtures of 2,4- and 2,6-toluenediisocyanate (TDI), generally furnished as an 80/20 or 65/35 isomer blend. Methylene diphenylene diisocyanates (MDI) are also useful. Commercial mixtures of 2,2'-, 2,4'-, and 4,4'-methylene diphenylene diisocyanates are suitable, with preference given to mixtures containing substantial quantities of the 4,4'-isomer. Polymethylene polyphenylene polyisocyanates having functionalities greater than 2 (polymeric MDI) are also suitable, as are mixtures of TDI, MDI and/or polymeric MDI. Modified isocyanates such as urea-, urethane-, biuret, and carbodiimide-modified isocyanates as non-limiting examples, are also suitable. The isocyanate should be present in an amount sufficient to provide an isocyanate index of from about 70 to about 130, preferably about 80 to 120, and in particular about 90 to 115.

Suitable catalysts include the amine and tinbased catalysts, which are preferred. Other catalysts may be used as well. Examples of amine catalysts are diethylenetriamine, triethylenediamine, bis(2,2'-di-methylamino)ethyl ether, N,N,N',N",N"-pentamethyldiethylenetriamine, and the like. Suitable tin catalysts include dibutyltin dilaurate, dibutyltin diacetate, stannous octoate, and the like. Most preferably, both amine and tin catalysts are utilized, typically at levels of from about 0.001 to 2 parts per hundred parts polyol.

Low molecular weight chain extenders/cross-linkers having molecular weights preferably below about 300 Da are generally employed to stabilize the rising foam and to control properties. Examples are glycerine, pentaerythritol, ethylene glycol, sorbitol, and in particular alkanolamines such as monoethanolamine, diethanolamine (DEOA) and triethanolamine (TEOA). DEOA is preferred, in amounts of from about 0 to 5 parts per hundred parts polyol, preferably about 0.4 to about 3.5 parts per hundred parts polyol.

Water is preferably used as the sole blowing agent. However, additional reactive or non-reactive blowing agents may be used in conjunction with water. Examples of additional blowing agents include dichloromethane, difluorodichloromethane, 1,1-dichloro-1-fluoroethane, 1,1,2-trichloro-1,2,2-trifluoroethane, hydrofluorocarbons (HFCs), perfluorocarbons (PFCs), lower alkanes such as butane, isobutane, pentane, cyclopentane, various low molecular weight ethers and ketones, and the like. Blowing agents such as air or other gases under pressure and liquid $CO_2$ under pressure may be used as well. Water, as stated, is preferred, in amounts ranging from about 1 to about 7 parts per hundred parts polyol and preferably 1 to about 5 parts.

Flame retardants, antioxidants, pigments, dyes, and fillers may also be used in conventional amounts. Combustion-modified foams may be prepared by inclusion of nitrogenous and other flame retardant fillers. Melamine is a preferred nitrogenous flame retardant filler.

The polyol component is the critical component of the subject invention. The polyol component may comprise a polyoxyalkylene polyol component optionally mixed with other isocyanate reactive polymers such as hydroxyl-functional polybutadienes, polyester polyols, amino-terminated polyether polyols, and the like, but preferably comprises one or more polyoxyalkylene polyether polyols at least one of which is manufactured with a DMC catalyst, and a polyol polymer dispersion prepared by in situ polymerization of polymerizable monomers in a polyoxyalkylene polyether "base polyol."

By the term "polyoxyalkylene component" is meant the total of all polyoxyalkylene polyether polyols, whether polyoxyalkylene polyether polyols containing no polymer dispersion or whether the base polyol(s) of one or more polyol polymer dispersions. As an example, in an isocyanate-reactive polyol component containing 40 parts by weight of a polymer polyol containing 30 weight percent vinyl polymer solids dispersed in a polyoxyalkylene polyether base polyol and 60 parts by weight of a polyoxyalkylene non-polymer-containing polyol, the polyoxyalkylene polyol component weight will be 88 parts by weight (60+ 70% of 40).

The low unsaturation poly(oxypropylene/oxyethylene) polyol component manufactured with double metal cyanide catalyst comprises from 100 weight percent to about 20 weight percent of the total polyol used to produce the foam. The poly(oxypropylene/oxyethylene) low unsaturation random polyols as herein defined are prepared by oxyalkylating a suitably hydric initiator compound with a mixture of propylene oxide and ethylene oxide in the presence of a double metal cyanide catalyst for a substantial portion of the total oxyalkylation, as more fully set forth below. The amount of ethylene oxide-derived moieties in the poly (oxypropylene/oxyethylene) low unsaturation random polyol blocks should be minimally 2 weight percent and preferably 5 weight percent or more. Preferably, the amount of ethylene oxide in the ethylene oxide/propylene oxide mixture is increased during the latter stages of the polymerization to increase the primary hydroxyl content of the polyol. Alternatively, the random polyol may be capped with ethylene oxide using non-DMC catalysts.

The poly(oxypropylene/oxyethylene) low unsaturation random polyols of the subject invention are prepared by oxyalkylating one or more initiator molecule(s) of suitable functionality in-the presence of a double metal cyanide catalyst suitable for preparing a polyol with low unsaturation as discussed previously. Preferably, double metal cyanide complex catalysts such as those disclosed in U.S. Pat. Nos. 5,158,922 and 5,470,813 are used, particularly for equivalent weights of greater than 1000 Da, and more particularly for equivalent weights of 2000 Da or higher. The foregoing U.S. patents are incorporated herein by reference. Equivalent weights and molecular weights expressed herein in Da (Daltons) are number average equivalent weights and molecular weights unless indicated otherwise.

When the oxyalkylation is performed in the presence of double metal cyanide complex catalysts, it is preferable that initiator molecules containing strongly basic groups such as primary and secondary amines be avoided. Further, when employing double metal cyanide complex catalysts, it is generally desirable to oxyalkylate an oligomer which comprises a previously oxyalkylated "monomeric" initiator molecule. It has been found, particularly with vicinal hydroxyl groups, that DMC oxyalkylation is initially slow and may be preceded by a considerable "induction period" where essentially no oxyalkylation takes place. Use of a polyoxyalkylene oligomer having an equivalent weight of from about 90 Da to about 1000 Da, preferably 90 Da to 500 Da has been found to mitigate these effects. The polyoxyalkylene oligomeric initiators may be prepared by oxyalkylating a "monomeric" initiator in the presence of traditional basic catalysts such as sodium or potassium hydroxide or other non-DMC catalysts.

A variety of suitable initiator molecules may be oxyalkylated to prepare the oligomeric initiators for the DMC reaction stage. Non-limiting examples include dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclohexanediol, 1,4-cyclohexanedimethanol, hydroquinone, hydroquinone bis (2-hydroxyethyl)ether, the various bisphenols, particularly bisphenol A and bisphenol F and their bis(hydroxyalkyl) ether derivatives, aniline, the various N-N-bis (hydroxyalkyl)anilines, primary alkyl amines and the various N-N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxyalkyl]ethylenediamines, toluene diamine and N,N,N',N'-tetrakis[hydroxyalkyl]toluene diamines; pentahydric initiators such as the various alkylglucosides, particularly α-methylglucoside; hexahydric initiators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound. Preferred initiators are the monomeric and oligomeric glycols, glycerine, trimethylolpropane, sorbitol, and sucrose.

The poly(oxypropylene/oxyethylene) low unsaturation random polyols of the subject invention may be oxyalkylated initially with all propylene oxide, or a previously prepared, all propylene oxide-derived oligomeric initiator may be used. However, regardless of whether a "monomeric" or oligomeric initiator is used, the amount of any all-propylene oxide-derived internal block produced with DMC catalyst must represent less than 35 weight percent of the total poly(oxypropylene/oxyethylene) low unsaturation random polyol weight, preferably 25 weight percent or less, and more preferably 20 weight percent or less. If the internal, DMC catalyzed polyoxypropylene content is 35 weight percent or more, there is a strong tendency toward foam shrinkage and the processing latitude is exceedingly narrow. Most preferably, polyoxypropylene internal blocks will represent no more than 12–15% of the total poly (oxypropylene/oxyethylene) low unsaturation random polyol weight.

To avoid foam shrinkage and expand the processing latitude, the bulk of the DMC catalyzed oxyalkylation should be performed with a mixture of propylene oxide and ethylene oxide, optionally including minor quantities of other alkylene oxides such as 1,2- and 2,3-butylene oxide. The ethylene oxide content of the continued oxyalkylation feed contains at least 2 weight percent ethylene oxide, preferably at least 5 weight percent, and more preferably at least 7 weight percent ethylene oxide. Most preferably, the final stages of the DMC catalyzed oxyalkylation are conducted with propylene oxide/ethylene oxide mixtures containing from 15 to 80 percent or more ethylene oxide. The total poly(oxyethylene) content of the final polyol should be at least 5% and preferably more than 10%.

High levels of ethylene oxide in the last stage of oxyalkylation may be used to increase the primary hydroxyl content of the polyol and provide suitable reactivity for stable processing of HR foam. With non-DMC catalysts, the amount of ethylene oxide in the final feed may be 100%, producing polyols having from 50 mol percent to 90 mol percent or higher primary hydroxyl content. With DMC catalysts, the alkylene oxide feed typically contains at least 10 weight percent propylene oxide or other higher alkylene oxide, otherwise ill-defined cloudy mixtures believed to contain extended polyoxyethylene structures will be produced. Primary hydroxyl contents of up to about 20 to 50 mol percent may be prepared by conducting final oxyalkylation with mixtures containing 40–90% ethylene oxide. If higher primary hydroxyl content is desired when employing DMC catalysts, a traditional basic catalyst may be added and oxyalkylation continued with all ethylene oxide. Surprisingly, the poly(oxypropylene/oxyethylene) low unsaturation random polyols of the subject invention function well in HR slabstock foam formulations without primary hydroxyl content higher than 50 mol percent, and in fact can be employed even at primary hydroxyl contents of as low as 19 mol percent.

The preparation of poly(oxypropylene/oxyethylene) low unsaturation random polyols preferably employs DMC catalysis and an oligomeric initiator molecule having an equivalent weight of from 200 Da to 500 Da, the initiator preferably having an oxypropylene content of from about 50 to 100 weight percent based on the weight of all oxyalkylene moieties present in the initiator. The DMC catalyzed oxyalkylation of the oligomeric initiator may be conducted in one stage with a fixed propylene oxide/ethylene oxide ratio, but is advantageously conducted in multiple stages with the second stage alkylene oxide composition containing a higher proportion of ethylene oxide. It is necessary, when two or more stages are utilized, that free ethylene oxide be present in the reactor essentially at all times, although short periods of only propylene oxide addition such as during initiation, may be tolerated as long as these oxypropylene blocks do not exceed 35% and preferably less than 10–15% of the final polyol weight. Such polyols are still essentially poly (oxypropylene/oxyethylene) low unsaturation random polyols. The equivalent weights of the polyols may range from less than 500 Da to in excess of 8000 Da, but are preferably in the range of 500 Da to 5000 Da. Polyoxyalkylation of all polyoxypropylene blocks of considerable size using catalysts other than double metal cyanide complex catalysts is acceptable. However, substantial DMC-catalyzed, all polyoxypropylene blocks must be avoided to eliminate foam shrinkage.

The polyol polymer dispersions useful in preparing the HR slabstock foams of the subject invention are preferably prepared from base polyols which comprise poly (oxypropylene/oxyethylene) low unsaturation random polyols or blends of these with conventionally base-catalyzed polyoxyalkylene polyols, preferably those having high primary hydroxyl content. As the proportion of polyol polymer dispersion utilized is generally less than 50 weight percent of the total polyol component, and as a considerable part of the polyol polymer dispersion represents essentially non-reactive solids, polyol polymer dispersions prepared from conventionally catalyzed, high primary hydroxyl base polyols may be used quite successfully.

The majority of polyol polymer dispersions utilized are polymer polyols prepared by the in situ polymerization of one or more vinyl monomers in a base polyol and having solids content in the range of 5 weight percent to 60 weight percent, or polymer-modified polyols prepared by reacting an isocyanate with an isocyanate-reactive monomer in situ in a base polyol, such as the now well known so-called PHD and PIPA polyols. The polymer-modified polyols are generally somewhat more limited in solids content due to increased viscosity at high solids loading. Suitable solids contents generally range from about 5 to 30 weight percent. The weight percent solids of both polymer polyols and polymer-modified polyols may be lowered by dilution with additional base polyol or by dilution with a different polyol including the low unsaturation random polyols of this invention. The methods of preparation of polymer polyols and polymer-modified polyols are conventional and well known to those skilled in the art.

Having generally described this invention, a further understanding can be obtained by reference to certain specific examples which are provided herein for purposes of illustration only and are not intended to be limiting unless otherwise specified.

Preparation Of A Solid DMC Catalyst Containing t-Butanol and an Isobutylene Oxide-Capped 4K mol. wt. Polyoxypropylene Diol as Complexing Agents Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), t-butanol (2 mL, organic complexing agent), and Polyol W (8 g). Polyol W is made by preparing a 4000 mol. wt. polyoxypropylene diol using double metal cyanide catalysis, and then endcapping it with from 1 to 5 equivalents per hydroxyl group of isobutylene oxide using the same DMC catalyst.

Solutions 1 and 2 are mixed together using a homogenizer. Immediately a 50/50 (by volume) mixture of t-butanol and DI water (200 mL total) is added to the zinc hexacyanocobaltate mixture, and the product is homogenized for 10 min.

Solution 3 (the polyol/water/t-butanol mixture) is added to the aqueous slurry of zinc hexacyanocobaltate, and the product is stirred magnetically for 2 min. The mixture is filtered under pressure through a 5-μm filter to isolate the solids.

The solid cake is reslurried in t-butanol (140 mL) and DI water (60 mL), and the mixture is homogenized for 10 min. A solution of DI water (200 mL) and additional Polyol W (2 g) is added, and the mixture is stirred magnetically for 2 min. and filtered as described above.

The solid cake is reslurried in t-butanol (200 mL) and is homogenized for 10 min. Polyol W (1 g) is added, and the mixture is stirred magnetically for 2 min. and filtered. The resulting solid catalyst is dried under vacuum at 50° C. (30 in. Hg.) to constant weight. The yield of dry, powdery catalyst is about 10 g.

Elemental, thermogravimetric, and mass spectral analyses of the solid catalyst show: polyol=18.0 wt. %; t-butanol=9.0 wt. %; cobalt=9.5 wt. %; zinc=20.1 wt. %.

A similar procedure is used to make additional catalysts that contain 23 and 50 wt. % of Polyol W, respectively.

Preparation of a Solid DMC Catalyst by Intimate Mixing

Solution 1 is prepared by dissolving zinc chloride (75 g) in t-butanol (50 mL) and distilled water (275 mL). Solution 2 is prepared by dissolving potassium hexacyanocobaltate (7.5 g) in distilled water (100 mL). Solution 3 is prepared by mixing t-butanol (2 mL) and distilled water (200 mL).

Solution 2 is added to solution 1 over 30 minutes with homogenization. Mixing by homogenization continues for an additional 10 minutes. A stir bar is added. Solution 3 is added, and the mixture is slowly stirred magnetically for 3 minutes. The mixture is filtered under pressure at 40 psig. The filter cake is reslurried in t-butanol (130 mL) and distilled water (55 mL), and the mixture is homogenized for 10 minutes. The mixture is filtered as described before. The cake is reslurried in neat t-butanol (185 mL), and is homogenized for 10 minutes. The mixture if filtered, and the cake dried under vacuum at 60° C. Yield: 8.6 g.

Typical Low Unsaturation Random Polyol Preparation With DMC Catalyst

A two-gallon stirred reactor is charged with polyoxypropylene triol (700 mol. wt.) starter (685 g) and zinc hexacyanocobaltate catalyst (1.63 g). The mixture is stirred and heated to 105° C., and is stripped under vacuum to remove traces of water from the triol starter. Propylene oxide (102 g) is fed to the reactor, initially under a vacuum of 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining charge of propylene oxide and ethylene oxide is added gradually in one or two stages over about 2–4 hours while maintaining a reactor pressure less than 40 psi. After alkylene oxide addition is complete, the mixture is held at 105° C. until a constant pressure is observed. Residual unreacted monomer is then stripped under vacuum from the polyol product. When catalyst removal is desired, the hot polyol product is filtered at 100° C. through a filter cartridge (0.45 to 1.2 microns) attached to the bottom of the reactor to remove the catalyst.

The product is a polyoxypropylene/polyoxyethylene random triol having a hydroxyl number of 28 and an unsaturation of less than 0.005 meq/g.

Polymer Polyol Preparation

A series of polymer polyols were produced in the conventional manner by the in situ polymerization of a mixture of styrene and acrylonitrile in a reactive high primary hydroxyl base polyol. The characteristics of the polymer polyols are as follows:

Polymer Polyol A—A 22.5% dispersion of styrene-acrylonitrile in a reactive base polyol. The base polyol was manufactured via standard KOH catalyzed addition of propylene oxide and then ethylene oxide to glycerol. The 35.5 hydroxyl number base polyol had an average nominal functionality of 3, a polyoxyethylene content of 15 wt. %, and a primary hydroxyl level of about 75%.

Polymer Polyol B—A 25% dispersion of styrene-acrylonitrile in a reactive base polyol blend. The base polyol blend was manufactured via standard KOH catalyzed addition of propylene oxide and then ethylene oxide to polyfunctional initiators (glycerol and sorbitol). The 31 hydroxyl number base polyol had an average nominal functionality of 4, a polyoxyethylene content of 17 wt. %, and a primary hydroxyl level of about 87%.

Polymer Polyol C—A 43% dispersion of styrene-acrylonitrile in a reactive base polyol. The base polyol blend was manufactured via standard KOH catalyzed addition of propylene oxide and ethylene oxide to glycerol. The 35 hydroxyl number base polyol had an average nominal functionality of 3, a polyoxyethylene content of 19 wt. %, and a primary hydroxyl level of about 89%.

Polymer Polyol AA—A 14.0% dispersion of styrene-acrlonitrile in a reactive base polyol. The base polyol was manufactured via standard KOH catalyzed addition of propylene oxide and then ethylene oxide to a mixture of glycerol and sorbitol. The 33 hydroxyl number base polyol had an average nominal (theoretical) functionality of 4.6, a polyoxyethylene content of 15 wt. %, and a primary hydroxyl level of about 70%.

Conventional Polyoxyalkylene Polyol Production

A series of conventional nominally trifunctional polyoxyalkylene polyols were prepared by oxyalkylation of glycerol in the presence of potassium hydroxide as the oxyalkylation catalyst. Polyols E and F have relatively high unsaturation due to their base-catalyzed oxypropylation. These polyols are identified as follows:

Polyol D—A polyol manufactured via standard KOH catalyzed addition of ethylene oxide to glycerol. The polyol had a hydroxyl number of 170, an average nominal functionality of 3, a polyoxyethylene content of about 90 wt. %, and a primary hydroxyl level of about 100%.

Polyol E—A polyol manufactured via standard KOH catalyzed addition of propylene oxide and then ethylene oxide to glycerol. The polyol had a hydroxyl number of 35, an average nominal functionality of 3, a polyoxyethylene content of about 15 wt. %, and a primary hydroxyl level of about 75%.

Polyol F—A polyol manufactured via standard KOH catalyzed addition of propylene oxide and then ethylene oxide to glycerol. The polyol had a hydroxyl number of 27, an average nominal functionality of 3, a polyoxyethylene content of about 15 wt. %, and a primary hydroxyl level of about 83%.

Polyol BB—A polyol manufactured via standard KOH catalyzed addition of propylene oxide and then ethylene oxide to sorbitol containing traces of water. The polyol had a hydroxyl number of 28; an average nominal functionality of 5.5 (actual unsaturation=0.07 meq/g), a poly(ethylene oxide) content of about 16 wt. %, and a primary hydroxyl level of about 87%.

Polyol CC—A polyol manufactured via KOH catalyzed addition of propylene oxide and then ethylene oxide to sorbitol containing traces of water at a reaction temperature of 60° C. to minimize unsaturation. The polyol had a hydroxyl number of 28; an average nominal functionality of 5.5 (actual unsaturation=0.010 meq/g), a poly(ethylene oxide) content of about 16 wt. %, and a primary hydroxyl level of about 87%.

DMC Catalyzed Polyols

A series of low unsaturation polyols were prepared by the general method of Example 3. In all cases except polyol K, a two-stage -oxyalkylation was performed with differing ratios of propylene oxide/ethylene oxide in the two stages. In all cases except polyol QC, an oligomeric, base-catalyzed, glycerine-initiated, all propylene oxide-derived c.a. 700 Da molecular weight triol was employed as the initiator for the first stage oxyalkylation, which was begun with all propylene oxide and switched to the first stage propylene oxide/ethylene oxide mixture immediately following initiation, the amount of propylene oxide prior to the switch representing about 1 weight percent propylene oxide addition. In polyol G, the switch was made after addition of 4% propylene oxide. Comparative example polyols, all having low unsaturation but where 35% or more of the total oxyalkylation was performed with only propylene oxide in the absence of ethylene oxide, are identified by a second letter "C". Polyol QC differed from the others in that a higher functionality oligomeric initiator, prepared by base catalyzed addition of propylene oxide to predominately sorbitol, was employed. The polyols are described as follows, with Table 1 summarizing their compositional makeup and preparation:

Polyol G—A DMC produced polyol having a hydroxyl number of about 28, a nominal functionality of 3, a primary hydroxyl level of about 19%, a total polyoxyethylene content of 15 wt. % in which 5% of the ethylene oxide was fed with propylene oxide during the initial phase of the reaction and the remaining 10% was fed with propylene oxide at a 60/40 propylene oxide/ethylene oxide (PO/EO) ratio during the second/final stage of the polymerization. The polyol unsaturation was 0.010 meq/g.

Polyol HC—A DMC produced polyol having a hydroxyl number of about 28, a nominal functionality of 3, a primary hydroxyl level of about 25%, and a total polyoxyethylene content of 15 wt. % all of which was fed with propylene oxide at a 60/40 PO/EO ratio during the second/final stage of the polymerization reaction. Only propylene oxide was fed during the initial phase of the reaction. The polyol unsaturation was less than 0.010 meq/g.

Polyol IC—A DMC produced polyol having a hydroxyl number of about 28, a nominal functionality of 3, a primary hydroxyl level of about 19%, and a total polyoxyethylene content of 20 wt. %, all of which was fed with propylene oxide at a 60/40 PO/EO ratio during the second/final stage of the polymerization reaction. Only propylene oxide was fed during the initial phase of the reaction. The polyol unsaturation was 0.010 meq/g.

Polyol JC—A DMC produced polyol having a hydroxyl number of about 28, a nominal functionality of 3, and a total polyoxyethylene content of 20 wt. %, all of which was fed with propylene oxide at a 60/40 PO/EO ratio during the second/final stage of the polymerization reaction. Only propylene oxide was fed during the initial phase of the reaction. The primary hydroxyl level was not determined. The polyol unsaturation was 0.009 meq/g.

Polyol K—A DMC produced polyol having a hydroxyl number of about 35, a nominal functionality of 3, a primary hydroxyl level of about 17%, a total polyoxyethylene content of 15 wt. %, in which the ethylene oxide was fed with propylene oxide throughout the polymerization. The polyol unsaturation was 0.004 meq/g.

Polyol LC—A DMC produced polyol having a hydroxyl number of about 28, a nominal functionality of 3, a primary hydroxyl level of about 31%, and a total polyoxyethylene content of 15 wt. % all of which was fed with propylene oxide at a 50/50 PO/EO ratio during the second/final stage of the polymerization reaction. Only propylene oxide was fed during the initial phase of the reaction. The polyol unsaturation was less than 0.003 meq/g.

Polyol M—A DMC produced polyol having a hydroxyl number of about 28, a nominal functionality of 3, a primary hydroxyl level of about 37%, and a total polyoxyethylene content of 20 wt. % in which 5% of the ethylene oxide was fed with propylene oxide during the initial phase of the reaction and the remaining 15% was fed with propylene oxide at a 40/60 PO/EO ratio during the second/final stage of the polymerization. The polyol unsaturation was 0.004 meq/g.

Polyol N—A DMC produced polyol having a hydroxyl number of about 28, a nominal functionality of 3, a primary hydroxyl level of about 33%, a total polyoxyethylene content of 15 wt. % in which 5% of the ethylene oxide was fed with propylene oxide during the initial phase of the reaction and the remaining 10% was fed with propylene oxide at a 40/60 PO/EO ratio during the second/final stage of the polymerization. The polyol unsaturation was 0.004 meq/g.

Polyol O—A DMC produced polyol having a hydroxyl number of about 28, a nominal functionality of 3, a primary hydroxyl level of about 31%, a total polyoxyethylene content of 15 wt. % in which 5% of the ethylene oxide was fed with propylene oxide during the initial phase of the reaction and the remaining 10% was fed with propylene oxide at a 50/50 PO/EO ratio during the second/final stage of the polymerization. The polyol unsaturation was 0.004 meq/g.

Polyol P—A DMC produced polyol having a hydroxyl number of about 28, a nominal functionality of 3, a primary hydroxyl level of about 39%, a total polyoxyethylene content of 20 wt. % in which 5% of the ethylene oxide was fed with propylene oxide during the initial phase of the reaction and the remaining 15% was fed with propylene oxide at a 20/80 PO/EO ratio during the second/final stage of the polymerization. The polyol unsaturation was 0.004 meq/g.

Polyol QC—A DMC and KOH. produced polyol having a hydroxyl number of about 28, a nominal functionality of 5.5, a primary hydroxyl level of about 87%, a total polyoxyethylene content of 16%, all of which was post-added as 100% EO after recatalyzing with KOH. Only propylene oxide was fed during the DMC catalyzed phase of the reaction. The polyol unsaturation was 0.010 meq/g.

TABLE 1

SUMMARY DESCRIPTION OF DMC POLYOLS USED IN EXAMPLES

| Polyol Reference | Starter WT %[1] | INTERNAL STAGE 1 FEED[2] EO/PO | WT % | CAPPING STAGE 2 FEED EO/PO | WT % | Hydroxyl Number | WT % RANDOM EO Internal | CAP | % Primary Hydroxyl | Unsatur., meq/g |
|---|---|---|---|---|---|---|---|---|---|---|
| G | 12 | 13/87 | 75 | 40/60 | 13 | 28 | 10 | 5 | 19 | 0.010 |
| HC | 12 | 0/100 | 42 | 40/60 | 38 | 28 | 0 | 15 | 25 | <0.010 |
| IC | 12 | 0/100 | 37 | 40/60 | 50 | 28 | 0 | 20 | 19 | 0.010 |
| JC | 15 | 0/100 | 47 | 40/60 | 38 | 35 | 0 | 15 | —[3] | 0.009 |
| K | 15 | 18/82 | 85 | (One Stage) | (One Stage) | 35 | 15 | — | 17 | 0.004 |
| LC | 12 | 0/100 | 58 | 50/50 | 30 | 28 | 0 | 15 | 31 | 0.003 |
| M | 12 | 8/82 | 63 | 60/40 | 25 | 28 | 5 | 15 | 37 | 0.004 |
| N | 12 | 7/93 | 71 | 60/40 | 17 | 28 | 5 | 10 | 33 | 0.004 |
| O | 12 | 7/93 | 68 | 50/50 | 20 | 28 | 5 | 10 | 31 | 0.004 |
| P | 12 | 8/92 | 61 | 80/20 | 19 | 28 | 5 | 15 | 39 | 0.004 |
| BB | 15 | 0/100 | 69 | 100/0 | 16 | 28 | 0 | 16 | 87 | 0.070 |
| CC | 15 | 0/100 | 69 | 100/0 | 16 | 28 | 0 | 16 | 87 | 0.010 |
| QC[4] | 15 | 0/100 | 69 | 100/0 | 16 | 28 | 0 | 16 | 87 | 0.010 |

[1] Wt % numbers represent weight percent of total polyol weight.
[2] Stage 1 feed is started with all PO and then switched to EO/PO after initiation of reaction. This all PO portion is approximately 1 wt. % of the total polyol in all cases except for Polyol G, where it was 4%.
[3] Not determined.
[4] Switched to standard KOH catalysis for EO capping stage.

FOAM EXAMPLES 1 AND 2 AND COMPARATIVE EXAMPLES 1C TO 4C

A series of nominally 3 pound/ft$^3$ (PCF) free rise HR foams was prepared in conventional manner, by mixing thoroughly all non-isocyanate ingredients, adding the isocyanate and mixing briefly, and pouring the mixture into a standard 14 inch (35.6 cm)×14 inch (35.6 cm)×6 inch (15.2 cm) cake box and allowing to rise freely, following which the settle is measured, and the foam oven-cured at 125° C. for 5 minutes. After a minimum of 16 hours at room temperature, shrinkage, if any, is noted, and a 12 inch (30 cm)×12 inch (30 cm) ×4 inch (10 cm) portion is cut for assessing the quality of the foam. The formulations and processing characteristics are noted in Table 2. In the table, NIAX® A1 is an amine type catalyst and L-5309 is a low potency polyether silicone surfactant, both available from OSi Specialties, Inc.; and DEOA is diethanolamine.

In Table 2, Comparative Example 1C is an HR foam prepared from conventionally base catalyzed, high unsaturation, high primary hydroxyl polyols, including the base polyol of the polymer polyol. A good quality foam was produced. In Examples 1 and 2, polyols K and G respectively, both subject invention low unsaturation polyols prepared employing both ethylene oxide and propylene oxide during oxyalkylation with a DMC catalyst, produced good quality foams exhibiting no visible shrinkage. In Comparative Examples 2C–4C, low unsaturation polyols in which a mixture of ethylene oxide and propylene oxide was used only in the last stage of DMC catalyzed oxyalkylation, resulting in polyols having a substantial internal DMC-catalyzed polyoxypropylene block, generated foams which produced no visible gas blow off, and which exhibited severe shrinkage in the case of Comparative Examples 2C and 3C, and a tight foam exhibiting noticeable shrinkage in the case of Comparative Example 4C. Visible gas blow off

TABLE 2

| FOAM EXAMPLE NO.: | 1 | 1C | 2C | 2 | 3C | 4C |
|---|---|---|---|---|---|---|
| Foam Formulation | | | | | | |
| Polymer Polyol A | 40.00 | 40.00 | 40.00 | 40.00 | 40.00 | 40.00 |
| Polyol D | 2.00 | 2.00 | 2.00 | 2.00 | 2.00 | 2.00 |
| Polyol E | | 58.00 | | | | |
| Polyol K | 58.00 | | | | | |
| Polyol JC | | | 58.00 | | | |
| Polyol G | | | | 58.00 | | |
| Polyol IC | | | | | 58.00 | |
| Polyol HC | | | | | | 58.00 |
| Water | 2.00 | 2.00 | 2.00 | 2.00 | 2.00 | 2.00 |
| DEOA | 1.50 | 1.50 | 1.50 | 1.50 | 1.50 | 1.50 |
| NIAX ® A-1 | 0.10 | 0.10 | 0.10 | 0.10 | 0.10 | 0.10 |
| Stannous Octoate | 0.20 | 0.20 | 0.20 | 0.20 | 0.16 | 0.16 |
| L-5309 Surfactant | 1.00 | 1.00 | 1.00 | 1.00 | 1.00 | 1.00 |
| 80/20 TDI | 28.44 | 28.44 | 28.44 | 27.81 | 27.81 | 30.08 |
| Index | 100.00 | 100.00 | 100.00 | 100.00 | 100.00 | 100.00 |
| Foam Processing | | | | | | |
| Visible Gas Blow Off | YES | YES | NO | YES | NO | NO |
| Settle, % | 1.63 | 1.31 | 0.37 | 6.3 | — | — |
| Visible Shrinkage | NONE | NONE | SEVERE | NONE | SEVERE | YES |
| Foam Quality | GOOD | GOOD | NOT USABLE | GOOD | NOT USABLE | TIGHT | is generally considered indicative of cell opening and typically results in good quality foam with minimal shrinkage.

FOAM EXAMPLES 3 to 9 AND COMPARATIVE EXAMPLES 5C TO 8C

A series of low density, nominally 1.8 PCF HR chemistry foams were prepared as in the previous examples, but using a higher level of water. The processing of such foams is considered more critical than that of higher density foams. The formulations and physical properties measured on the resultant cured foams are given in Tables 3A and 3B. The foams of Comparative Examples 5C and 7C shrank too severely and physical properties were not measured. C-183 is an amine catalyst available from OSi Specialties, Inc., and B-8707 a low potency HR silicone surfactant available from Goldschmidt, A. G.

TABLE 3A

| FOAM EXAMPLE NO.: | 3 | 4 | 5 | 5C | 6C |
|---|---|---|---|---|---|
| Foam Formulation | | | | | |
| Polymer Polyol B | 36.00 | 36.00 | 36.00 | 36.00 | 36.00 |
| Polyol F | | | | | 64.00 |
| Polyol O | 64.00 | | | | |
| Polyol M | | 64.00 | | | |
| Polyol N | | | 64.00 | | |
| Polyol LC | | | | 64.00 | |
| Water | 3.20 | 3.20 | 3.20 | 3.20 | 3.20 |
| DEOA | 2.50 | 2.50 | 2.50 | 2.50 | 2.50 |
| C-183 Amine Catalyst | 0.12 | 0.12 | 0.12 | 0.12 | 0.12 |
| Stannous Octoate | 0.18 | 0.18 | 0.18 | 0.18 | 0.18 |
| B-8707 Silicone Surfactant | 2.00 | 2.00 | 2.00 | 2.00 | 2.00 |
| 80/20 TDI | 42.47 | 42.47 | 42.47 | 42.47 | 42.45 |
| Index | 103.00 | 103.00 | 103.00 | 103.00 | 103.00 |
| Foam Processing | | | | | |
| Visible Gas Blow Off | YES | YES | YES | NO | YES |
| Settle, % | 0.77 | 1.40 | 1.49 | — | 2.16 |
| Shrinkage | NONE | NONE | NONE | SEVERE | SLIGHT |
| Foam Quality | GOOD | GOOD | GOOD | NOT USABLE | GOOD |
| Foam Properties | | | | | |
| Density (PCF) | 2.01 | 1.83 | 1.71 | | 1.85 |
| Resiliency (%) | 57.00 | 58.00 | 53.00 | | 61.00 |
| Porosity | 0.85 | 0.74 | 0.88 | | 1.43 |
| IFD Size (12" × 12" × in.) | 3.96 | 3.98 | 4.00 | | 4.09 |
| 25% IFD (LBS/50 SQ IN) | 18.10 | 24.14 | 23.34 | | 24.27 |
| 65% IFD (LBS/50 SQ IN) | 43.58 | 54.83 | 53.46 | | 57.03 |
| 25% Return Val (%) | 82.15 | 80.07 | 81.49 | | 80.93 |
| IFD 65/25 | 2.41 | 2.27 | 2.29 | | 2.35 |
| Tensile (PSI) | 16.21 | 13.32 | 15.71 | | 14.73 |
| Elongation (%) | 179.03 | 115.55 | 143.28 | | 127.05 |
| Tear (PLI) | 1.56 | 1.14 | 1.21 | | 1.04 |
| 90% Comp. Set (%) | 5.00 | 5.14 | 3.73 | | 3.13 |
| 75% HACS (%) | 10.54 | 11.75 | 10.04 | | 11.09 |
| 50% Wet Set (%) | 31.90 | 21.04 | 17.60 | | 19.57 |

TABLE 3B

| FOAM EXAMPLE NO.: | 6 | 7 | 8 | 7C | 8C | 9 |
|---|---|---|---|---|---|---|
| Foam Formulation | | | | | | |
| Polymer Polyol B | 36.00 | 36.00 | 36.00 | 36.00 | 36.00 | |
| Polymer Polyol C | | | | | | 21.00 |
| Polyol F | | | | | 64.00 | |
| Polyol N | 64.00 | | | | | |
| Polyol M | | 64.00 | | | | |
| Polyol O | | | 64.00 | | | |
| Polyol LC | | | | 64.00 | | |
| Polyol P | | | | | | 79.00 |
| Water | 3.20 | 3.20 | 3.20 | 3.20 | 3.20 | 3.20 |
| DEOA | 2.50 | 2.50 | 2.50 | 2.50 | 2.50 | 2.50 |
| C-183 Amine Catalyst | 0.18 | 0.18 | 0.18 | 0.18 | 0.18 | 0.05 |
| Stannous Octoate | 0.12 | 0.12 | 0.12 | 0.12 | 0.12 | 0.25 |
| B-8707 Silicone Surfactant | 2.00 | 2.00 | 2.00 | 2.00 | 2.00 | 2.00 |
| 80/20 TDI | 42.47 | 42.47 | 42.47 | 42.47 | 42.45 | 42.45 |
| Index | 103.00 | 103.00 | 103.00 | 103.00 | 103.00 | 103.00 |
| Foam Processing | | | | | | |
| Visible Gas Blow Off | YES | YES | YES | NO | YES | YES |
| Settle, % | 1.79 | 2.31 | 3.65 | — | 4.56 | 3.79 |

TABLE 3B-continued

| FOAM EXAMPLE NO.: | 6 | 7 | 8 | 7C | 8C | 9 |
|---|---|---|---|---|---|---|
| Shrinkage | NONE | NONE | NONE | SEVERE | NONE | NONE |
| Foam Quality | GOOD | GOOD | GOOD | NOT USABLE | GOOD | GOOD |
| Foam Properties | | | | | | |
| Density | 1.95 | 1.81 | 2.00 | | 1.82 | 1.71 |
| Resiliency (%) | 51.00 | 60.00 | 56.00 | | 62.00 | 50.00 |
| Porosity | 0.70 | 0.79 | 0.91 | | 1.11 | 0.80 |
| IFD Size (12" × 12" × in.) | 4.01 | 4.00 | 4.00 | | 4.07 | 4.09 |
| 25% IFD (LBS/50 SQ IN) | 22.39 | 24.17 | 24.71 | | 20.22 | 23.57 |
| 65% IFD (LBS/50 SQ IN) | 49.99 | 55.35 | 57.61 | | 48.10 | 50.19 |
| 25% Return Val (%) | 81.69 | 82.04 | 81.22 | | 82.44 | 81.13 |
| IFD 65/25 | 2.23 | 2.29 | 2.33 | | 2.38 | 2.13 |
| Tensile (PSI) | 13.46 | 10.88 | 15.85 | | 10.32 | 13.77 |
| Elongation (%) | 118.19 | 105.97 | 121.09 | | 99.67 | 137.41 |
| Tear (PLI) | 1.11 | 1.10 | 1.28 | | 1.29 | 1.30 |
| 90% Comp. Set (%) | 3.89 | 3.67 | 3.51 | | 3.15 | 4.09 |
| 75% HACS (%) | 11.02 | 11.39 | 12.24 | | 12.24 | 7.44 |
| 50% Wet Set (%) | 16.51 | 19.32 | 19.61 | | 21.47 | 13.09 |

Tables 3A-3B indicate that standard low density HR formulation 6C produced a good quality foam with slight shrinkage, and standard HR formulation 8C produced a good quality foam with no shrinkage. Both formulations utilized conventionally base-catalyzed, high primary hydroxyl content polyols, including the base polyol of the polymer polyol. Examples 3 to 9 of the subject invention all produced good quality foams with no visible shrinkage. However, Comparative Examples 5C and 7C produced unusable foams exhibiting severe shrinkage and no visible gas blow off. Both these examples employed low unsaturation polyols having substantial all-oxypropylene internal blocks. The foams of the subject invention were, on average, somewhat better quality foams than foams prepared from the standard HR polyols, with generally higher tensile strength and elongation, and in most cases, nearly identical or increased tear strength, but on average had slightly less resiliency. The but slight loss in resiliency is particularly surprising in view of the low primary hydroxyl content of the polyols used. HR slabstock foams generally require a high overall primary hydroxyl content.

Foam Comparative Examples 9C-14C

A series of low density HR foams were prepared as in the previous examples the formulations and processing characteristics of which are noted in Table 4. U-2000 silicone is an HR silicone surfactant available from OSi Specialties, Inc., and DBTDL is a tin catalyst composed of dibutyltin dilaurate.

TABLE 4

| FOAM EXAMPLE NO.: | 9C | 10C | 11C | 12C | 13C | 14C |
|---|---|---|---|---|---|---|
| Foam Formulation | | | | | | |
| Polymer Polyol AA | 58.00 | 58.00 | 58.00 | 58.00 | 58.00 | 58.00 |
| Polyol D | 2.00 | 2.00 | 2.00 | 2.00 | 2.00 | 2.00 |
| Polyol BB | 40.00 | 40.00 | | | | |
| Polyol CC | | | 40.00 | 40.00 | | |
| Polyol QC | | | | | 40.00 | 40.00 |
| Water | 3.80 | 3.80 | 3.80 | 3.80 | 3.50 | 3.50 |
| DEOA | 2.00 | 2.00 | 2.00 | 2.00 | 1.00 | 1.00 |
| C-183 (Amine Cat.) | 0.20 | 0.20 | 0.20 | 0.20 | 0.20 | 0.20 |
| DBTDL (Tin Cat.) | 0.02 | 0.03 | 0.02 | 0.03 | 0.02 | 0.03 |
| U-2000 (Silicone) | 0.80 | 0.80 | 0.80 | 0.80 | 1.00 | 1.00 |
| DE-60F SP (FR) | 4.00 | 4.00 | 4.00 | 4.00 | 4.00 | 4.00 |
| 80/20 TDI | 46.54 | 46.54 | 46.54 | 46.54 | 43.14 | 43.14 |
| Index | 103.00 | 103.00 | 103.00 | 103.00 | 105.00 | 105.00 |
| Foam Processing | | | | | | |
| Visible Gas Blow Off | YES | YES | YES | YES | NO | NO |
| Settle, % | 2.00 | 1.4 | 1.5 | 3.6 | 0.3 | 0.0 |
| Visible Shrinkage | SLIGHT | SLIGHT | SLIGHT | SLIGHT | SEVERE | SEVERE |
| Foam Quality | GOOD | GOOD | GOOD | GOOD | NOT USABLE | NOT USABLE |

Polyol BB is a standard KOH catalyzed reactive HR polyol having a high primary hydroxyl content and high unsaturation (0.07 meq/g) which yields good foam with only slight shrinkage (Examples 9C and 10C). Polyol CC is also a KOH catalyzed reactive polyol, however, a low polymerization temperature (60° C.) and greatly extended processing time was used to yield a low unsaturation level (0.010 meq/g) comparable to DMC catalyzed products. This polyol also yielded good foam with only slight shrinkage (Examples 11C and 12C). Polyol QC is a polyol similar to CC except that oxypropylation was conducted in the presence of a DMC catalyst, followed by a KOH catalyzed stage to provide a polyoxyethylene cap to yield a low unsaturation (0.010 meq/g) polyol with high reactivity. When employed in a similar HR foam formulation, this polyol yielded very tight foam with severe shrinkage (Examples 13C and 14C). This demonstrates that high primary hydroxyl level does not overcome the tightening influence of DMC catalyzed poly (oxypropylene) structures within the polyol. The example also demonstrates that the differences in processing are not due merely to low monol content and low unsaturation, but due to fundamental differences in polyol structure brought about by DMC catalysis.

Having now fully described the invention, it will be apparent to one of ordinary skill in the art that many changes and modifications can be made thereto without departing from the spirit or scope of the invention as set forth herein.

What is claimed is:

1. A polyol suitable for use in a high resilience foam formulation at levels of greater than about 20 percent of the weight of a polyol component used to prepare said foam while producing a foam with little or no shrinkage, said polyol comprising a polyoxyalkylene polyol prepared at least in part in the presence of a double metal cyanide complex oxyalkylation catalyst and having an unsaturation of less than 0.02 meq/g, wherein said polyoxyalkylene polyol contains less than 35 weight percent of an all polyoxypropylene internal block prepared in the presence of said double metal cyanide complex catalyst, and wherein said polyoxyalkylene polyol has one or more random poly(oxypropylene/oxyethylene) external block(s), each of said external blocks containing minimally 2 weight percent oxyethylene moieties based on the weight of the block(s).

2. The polyol of claim 1 wherein said polyoxypropylene internal block constitutes less than about 20 weight percent of said polyol, and wherein at least one of said one or more external block(s) constitutes about 7 weight percent or more oxyethylene moieties based on the weight of the block.

3. The polyol of claim 2 wherein a most external block contains about 40 weight percent or more oxyethylene moieties based on the weight of the block.

4. The polyol of claim 1 wherein said polyol is end-capped with an all oxyethylene block such that the primary hydroxyl content of said polyol is greater than about 50 mol percent.

5. A polyol blend suitable for the preparation of shrink-free high resilience polyurethane foam, comprising one or more polyols of claim 1 in an amount of 20 weight percent or more based on the weight of said polyol blend, and up to 80 weight percent of one or more primary hydroxyl polyols.

6. The polyol blend of claim 5 further comprising an amount of one or more polyol polymer dispersions effective to provide a solids content of from about 2 weight percent to about 35 weight percent based on the weight of said polyol blend.

7. The polyol blend of claim 5 wherein said polyol(s) of claim 1 comprise greater than 50 weight percent of said polyol blend.

8. The polyol of claim 1 wherein at least 70 mol percent of oxyalkylene moieties of said polyoxyalkylene polyol are derived from oxyalkylation in the presence of a double metal cyanide complex catalyst.

* * * * *